(12) United States Patent
Gerami

(10) Patent No.: US 8,060,095 B1
(45) Date of Patent: Nov. 15, 2011

(54) INDIVIDUAL NEIGHBOR THRESHOLD AND HYSTERESIS ASSIGNMENT

(75) Inventor: Shervin Gerami, Ashburn, VA (US)

(73) Assignee: Nextel Communications Inc., Reston, VA (US)

( * ) Notice: Subject to any disclaimer, the term of this patent is extended or adjusted under 35 U.S.C. 154(b) by 1530 days.

(21) Appl. No.: 11/482,055

(22) Filed: Jul. 7, 2006

Related U.S. Application Data

(60) Provisional application No. 60/696,801, filed on Jul. 7, 2005.

(51) Int. Cl.
*H04Q 7/20* (2006.01)

(52) U.S. Cl. ........ 455/437; 455/436; 455/438; 455/439; 455/440; 455/443; 455/453; 370/331; 370/332; 370/333; 709/222; 709/218; 709/225; 375/130; 375/150

(58) Field of Classification Search .................. 455/436, 455/437, 438, 439, 440, 441, 442, 443, 444, 455/433, 446, 449; 370/331, 332, 333; 709/222, 218, 225; 375/130, 150
See application file for complete search history.

(56) References Cited

U.S. PATENT DOCUMENTS

| | | | |
|---|---|---|---|
| 6,044,249 A | 3/2000 | Chandra et al. | |
| 6,745,033 B1 * | 6/2004 | Shah et al. | 455/436 |
| 7,031,710 B2 | 4/2006 | Pedraza et al. | |
| 2002/0082012 A1 * | 6/2002 | Wang et al. | 455/436 |
| 2005/0101328 A1 * | 5/2005 | Son et al. | 455/436 |
| 2006/0094432 A1 * | 5/2006 | Chang et al. | 455/439 |

* cited by examiner

*Primary Examiner* — Patrick Edouard
*Assistant Examiner* — Fred Casca

(57) ABSTRACT

Systems and methods for handover of a mobile station to a base station are provided. Handover criteria for determining which base station to handover to is different for different candidate base stations. This difference can account for base station loading and/or environmental factors. The handover criteria can include a threshold and hysteresis value. A wireless communication system can employ a fixed threshold and hysteresis value for all base stations, and these fixed values are adjusted differently for different candidate base stations.

15 Claims, 4 Drawing Sheets

INDIVIDUAL NEIGHBOR THRESHOLD AND HYSTERESIS ASSIGNMENT

CROSS-REFERENCE TO RELATED APPLICATIONS

The present application claims priority under 35 U.S.C. §119 to U.S. Provisional Application No. 60/696,801, filed Jul. 7, 2005, the entire disclosure of which is herein expressly incorporated by reference.

BACKGROUND OF THE INVENTION

In wireless communication networks, such as cellular networks, mobile stations can move through large geographic areas, while maintaining a call, due to the concept of mobility. In wireless networks mobility refers to the ability of a mobile station to move between wireless access points, e.g., base stations, while maintaining communications with another communication station. Known handover techniques use mobile station measurements, base station measurements, or a combination of these measurements.

Because handovers may result in a disruption or dropping of a call, and because handovers consume network resources, handovers are typically controlled in some manner. For example, handover determinations are typically based on a comparison of measured signal strengths (either of a signals transmitted from the mobile station being measured by the base station or a signals transmitted from a base station being measured by the mobile station) with a threshold and hysteresis value. When the signal strength of signals between a mobile station and a base station currently serving the mobile station (herein referred to as a serving base station) falls below a threshold value and the strength of signals between the mobile station and another base station (herein referred to as the target base station) are above the threshold value by a predetermined hysteresis value, then the mobile station hands-off from the serving base station to the target base station. Various other ways of using hysteresis and threshold values are known in the art.

SUMMARY OF THE INVENTION

Different types of wireless networks use different types of handover techniques. One type of wireless network is the iDEN network, such as the one owned and operated by Sprint Nextel Corporation. Currently, handover threshold and hysteresis values in iDEN are set a on per cell site basis, such that these values are the same regardless of which particular neighbor base station is the target base station a mobile station is attempting to handover to.

Exemplary embodiments of the present invention provide different handover criteria for different base stations. The different handover criteria can be adjusted to control base station loading and/or compensate for environmental factors. The handover criteria can include thresholds and hysteresis values, and these values can be adjusted by a different adjustment value for at least two base stations.

Other objects, advantages and novel features of the present invention will become apparent from the following detailed description of the invention when considered in conjunction with the accompanying drawings.

BRIEF DESCRIPTION OF THE DRAWING FIGURES

DETAILED DESCRIPTION OF THE PREFERRED EMBODIMENTS

Figure 1:
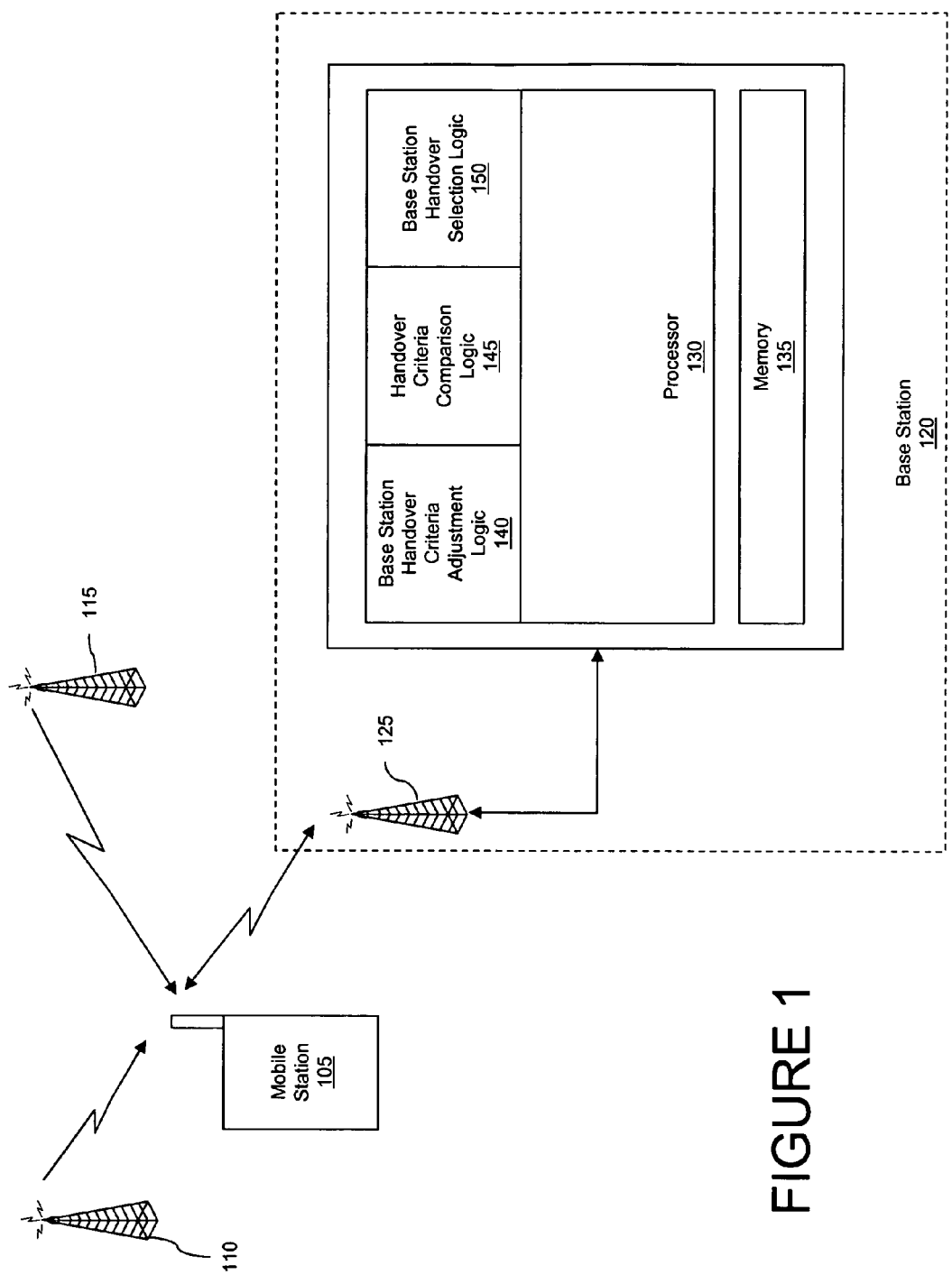
FIG. 1 is a block diagram of an exemplary wireless communication system in accordance with exemplary embodiments of the present invention.

FIG. 1 is a block diagram of an exemplary wireless communication system in accordance with exemplary embodiments of the present invention. The system includes a mobile station 105, serving base station 120 and handover candidate base stations 110 and 115. As illustrated in FIG. 1, mobile station 105 is in two-way communication with base station 120, and receives signals from base stations 110 and 115. The signals received from base stations 110 and 115 can be signals directed to mobile station 105 as part of a handover procedure, signals transmitted for any mobile station to use as part of a handover procedure, or signals directed to other mobile stations as part of a normal communication. Mobile station 105 measures the signals from base stations 110 and 115, and these measurements are used to determine whether to handover to one of these base stations, as will be described in more detail below.

Base station 120 includes an antenna 125, processor 130 and memory 135. Processor 130 includes logic 140-150, which will be described in more detail below in connection with FIG. 2. Processor 130 can be a microprocessor, field programmable gate array (FPGA), application specific integrated circuit (ASIC) and/or the like. Memory 135 can be any type of memory including volatile memory (such as random access memory) or non-volatile memory (such as read-only memory). When processor 130 is a microprocessor, logic 140-150 can be processor-executable code loaded from memory 135.

For ease of explanation, and not limitation, base stations 110 and 115 are illustrated with only the base station tower and not the details of the base station. It should be recognized, however, that these base stations can include the same components as base station 120.

Figure 2:
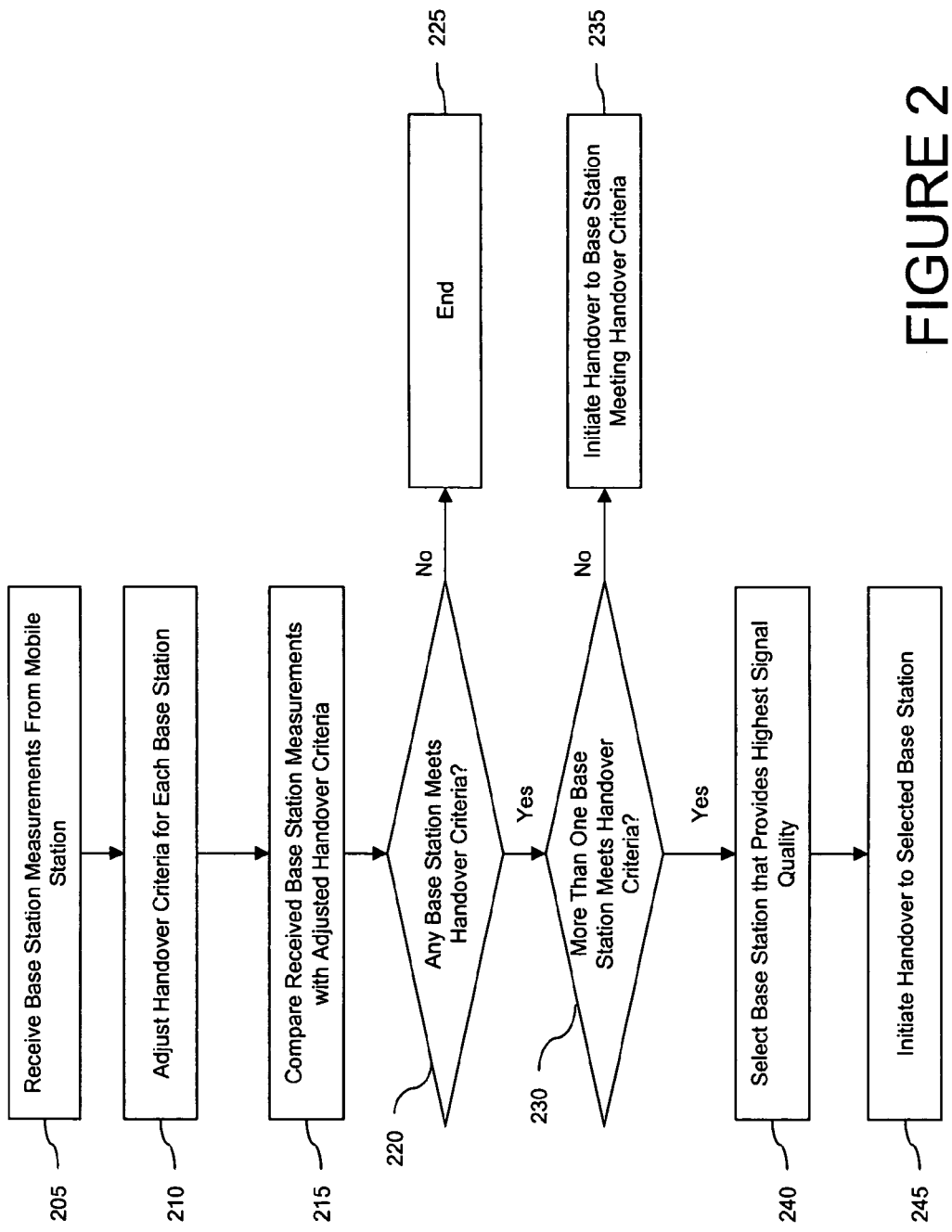
FIG. 2 is a flow diagram of an exemplary method for handover in accordance with exemplary embodiments of the present invention.

FIG. 2 is a flow diagram of an exemplary method for handover in accordance with exemplary embodiments of the present invention. Initially, base station 120 receives measurements from mobile station 105 (step 205). These measurements can include received signal strength indications (RSSIs) and signal quality estimates (SQE) for each handover candidate base station 110 and 115, as well as measurements for serving base station 120. Logic 140 adjusts the handover criteria for each base station for which it has received measurements (step 210). In accordance with exemplary embodiments of the present invention, the handover criteria can be different for each base station. The handover criteria can be adjusted to balance the loads placed on the different base stations, i.e., to "encourage" handover to base stations with lower loads. The handover criteria can also be adjusted to account for radio frequency environmental factors. For example, when a mobile station is supported by base station 120 it may be that mobile station measurements of base station 110 indicate an acceptable signal quality. However, due to environmental factors, such as the presence of a building or other obstruction, it is known that this acceptable signal strength is temporary and that when the mobile station moves only a small distance towards the base station the signal quality will drop below an acceptable level.

The handover criteria adjustment can be performed in a number of different ways. Specifically, an adjustment value can be added or subtracted from a handover threshold and/or hysteresis value. In some systems mobile station's measurements may account for fixed threshold and hysteresis values for all base stations. In these systems the base station can adjust the threshold and hysteresis values while accounting for the mobile station's adjustment of the measurements for the fixed threshold and hysteresis value.

Logic 145 then compares the received base station measurements with the adjusted handover criteria (step 215) and logic 150 determines whether any base stations meet the handover criteria (step 220). When no base stations meet the handover criteria ("No" path out of decision step 220), then handover processing using these measurements ends (step 225). When at least one base station meets the handover criteria ("Yes" path out of decision step 220), then the base station determines whether more than one base station meets the handover criteria (step 230). When only one base station meets the handover criteria ("No" path out of decision step 230), then the base station instructs the mobile station and/or the base station meeting the handover criteria to initiate a handover (step 235). If, however, more than one base station meets the handover criteria ("Yes" path out of decision step 230), then the base station that provides the highest signal quality is selected (step 240) and the base station instructs the mobile station and/or the selected base station to initiate a handover (step 245).

It should be recognized that the method of FIG. 2 is merely exemplary and can be subject to a variety of modifications. For example, instead of the adjustment of handover criteria (step 210) being performed after receiving base station measurements from the mobile station, this can be performed at a different time and/or can be performed continuously, adjusting for variations of the wireless communication system.

Figure 3A:
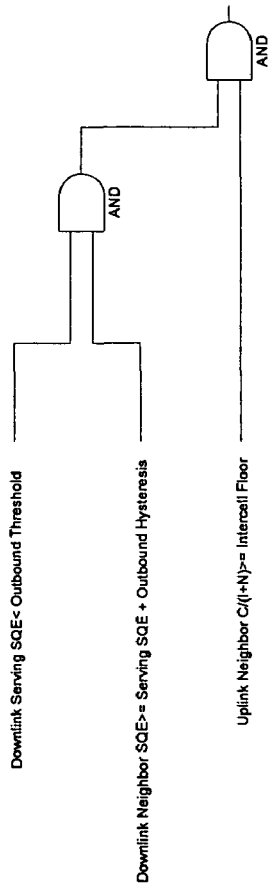
FIGS. 3a-3c are exemplary logic diagrams of handover criteria in accordance with exemplary embodiments of the present invention.
Figure 3C:
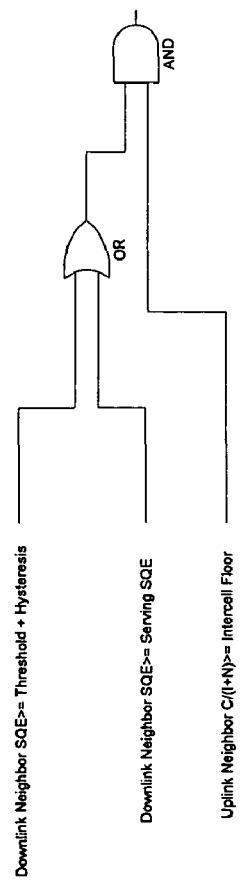
Figure 3B:
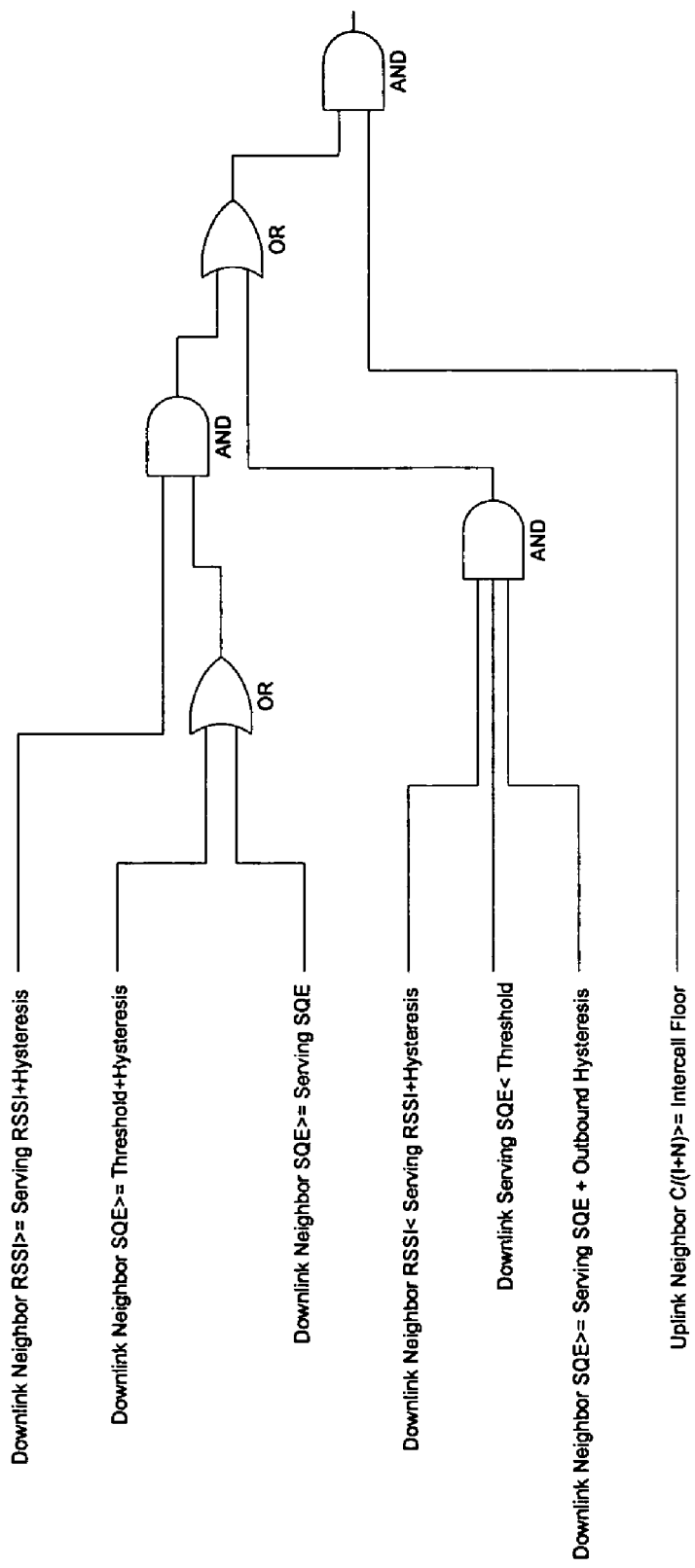

FIGS. 3a-3c are exemplary logic diagrams of handover criteria in accordance with exemplary embodiments of the present invention. Any one of these handover criteria can be employed by the present invention. Moreover, when a wireless communication system divides mobile stations into different classes (e.g., providing differing quality of service (QoS) levels), then the handover criteria illustrated in FIG. 3a can be employed for class 1 mobile stations, the handover criteria illustrated in FIG. 3b can be employed for class 2 mobile stations and the handover criteria illustrated in FIG. 3c can be employed for class three mobile stations.

Although exemplary embodiments of the present invention describes the base station as performing the handover criteria adjustments, this can be performed by other network elements, such as an access control gateway (ACG). The method described above in connection with FIG. 2 uses measurements received from a mobile station in handover-related messages. However, the present invention can also be employed to use measurement reports from a mobile station that are sent while the mobile station is engaged in a call, such as a Measurement Coverage Response message.

As used in the description above, the term mobile station includes wireless telephones, personal digital assistants (PDAs), pagers, computers and/or the like. Although exemplary embodiments of the present invention are described in connection with an iDEN network, the present invention can be implemented in other networks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining whether to handover a mobile station, the method comprising the acts of:
comparing signal strength measurements for a first base station to a first handover criteria to produce a first comparison result;
comparing signal strength measurements for a second base station to a second handover criteria to produce a second comparison result,
wherein the signal strength measurements include a received signal strength indication (RSSI) and signal quality error (SQE); and
determining whether to handover the mobile station to the first or second base station based on the first and second comparison results, wherein different first and second handover criteria are employed according to a quality of service level of the mobile station,
wherein for a first quality of service level of the mobile station the first handover criteria comprise a first determination of whether a downlink SQE of the first base station is less than a threshold, a second determination of whether a downlink SQE of the second base station is greater than or equal to the downlink SQE of the first base station plus a hysteresis value, the first determination and the second determination combined together and further combined with a third determination of whether an uplink carrier-divided-by-interference-plus-noise value of the second base station is greater than or equal to an intercell floor.

2. The method of claim 1, further comprising:
adjusting a fixed threshold and hysteresis value to produce a first threshold and hysteresis values.

3. The method of claim 2, wherein the fixed threshold and hysteresis values are adjusted based upon loading at the first base station.

4. The method of claim 1, further comprising the acts of:
receiving the signal strength measurements for the first and second base stations from the mobile station; and
adjusting the received signal strength measurements for comparison with the first and second handover criteria.

5. The method of claim 1, wherein the signal strength measurements are received from a mobile station.

6. The method of claim 5, wherein the signal strength measurements are received in a handover-related measurement message.

7. The method of claim 5, wherein the signal strength measurements are received in a measurement report sent while the mobile station is engaged in a call.

8. The method of claim 1, wherein when the mobile station is not handed over to the first base station or the second base station, the mobile station remains with a serving base station.

9. A base station in communication with a mobile station, comprising:
a processor; and
a memory coupled to the processor,
wherein the processor includes
logic for comparing signal strength measurements for a first base station to a first handover criteria to produce a first comparison result and for comparing signal strength measurements for a second base station to a second handover criteria to produce a second comparison result.

wherein the signal strength measurements include a received signal strength indication (RSSI) and signal quality error (SQE); and logic for determining whether to handover the mobile station to the first or second base station based on the first and second comparison results, wherein different first and second handover criteria are employed according to a quality of service level of the mobile station, wherein for a first quality of service level of the mobile station the first handover criteria comprise a first determination of whether a downlink SQE of the first base station is less than a threshold, a second determination of whether a downlink SQE of the second base station is greater than or equal to the downlink SQE of the first base station plus a hysteresis value, the first determination and the second determination combined together and further combined with a third determination of whether an uplink carrier-divided-by-interference-plus-noise value of the second base station is greater than or equal to an intercell floor.

10. The base station of claim 9, wherein the processor further comprises:

logic for adjusting a fixed threshold and hysteresis value to produce a first threshold and hysteresis values.

11. The base station of claim 10, wherein the fixed threshold and hysteresis values are adjusted based upon loading at the first base station.

12. The base station of claim 9, wherein the signal strength measurements are received from a mobile station.

13. The base station of claim 12, wherein the signal strength measurements are received in a handover-related measurement message.

14. The base station of claim 13, wherein the signal strength measurements are received in a measurement report sent while the mobile station is engaged in a call.

15. The base station of claim 9, wherein when the mobile station is not handed over to the first base station or the second base station, the mobile station remains with a serving base station.

* * * * *